United States Patent [19]
Hickok, Jr. et al.

[11] Patent Number: 6,056,886
[45] Date of Patent: May 2, 2000

[54] WATER LEVEL AND FLOW CONTROL DEVICE AND SKIMMER BOX PROVIDED WITH THIS DEVICE

[75] Inventors: Roy S. Hickok, Jr., Moorpark; Roger W. McGrath, Simi Valley, both of Calif.

[73] Assignee: Aquaria, Inc., Moorpark, Calif.

[21] Appl. No.: 09/092,921

[22] Filed: Jun. 8, 1998

[51] Int. Cl.$^7$ ............................... C02F 1/40; F04F 10/00
[52] U.S. Cl. ............................ 210/776; 210/94; 210/97; 210/169; 210/416.2; 137/140; 137/143; 137/591; 119/259
[58] Field of Search ..................................... 210/776, 169, 210/94, 97, 416.2; 119/259; 137/87.02, 130, 132, 140, 143, 144, 152, 171, 197, 559, 591

[56] References Cited

U.S. PATENT DOCUMENTS

| | | |
|---|---|---|
| 125,559 | 4/1872 | Fox . |
| 1,924,822 | 8/1933 | Wheeler et al. . |
| 2,946,475 | 7/1960 | Rockelman . |
| 3,785,493 | 1/1974 | Harding . |
| 3,835,813 | 9/1974 | Katz . |
| 4,414,997 | 11/1983 | Jacobson et al. . |
| 4,684,462 | 8/1987 | Augustyniak . |
| 4,909,948 | 3/1990 | Eichelberger, Sr. . |
| 5,006,230 | 4/1991 | Votava, III et al. . |
| 5,176,824 | 1/1993 | Willinger et al. . |
| 5,449,454 | 9/1995 | Hickok . |
| 5,632,887 | 5/1997 | Gargas et al. . |

Primary Examiner—David A. Simmons
Assistant Examiner—Fred Prince
Attorney, Agent, or Firm—Pillsbury Madison & Sutro

[57] ABSTRACT

A system for controlling a flow of water out of a container in a manner to prevent the generation of noise as an incident to the outflow and to permit adjustment of the water level in the container, the container being a component of apparatus for maintaining water at a desired level in an enclosure. The system basically includes: an outflow conduit defining an outlet flow path via which water flows downwardly out of the container, the conduit having an upper end located within the container and having an inlet opening; a cap overlying the inlet opening and defining with the conduit upper end an annular flow path via which water flows to the inlet opening; and a vent tube extending vertically downwardly through the cap and into the conduit to establish an air flow path between a region above water in the container and a region within the conduit.

18 Claims, 9 Drawing Sheets

WATER LEVEL AND FLOW CONTROL DEVICE AND SKIMMER BOX PROVIDED WITH THIS DEVICE

BACKGROUND OF THE INVENTION

The present invention relates to water level control systems for controlling the level of water in a container to which water is added continuously or periodically. The invention relates more particularly to water level control systems intended for maintaining a desired water level in an aquarium. A water level control system according to the invention is primarily intended for use in an aquarium skimmer box assembly.

A skimmer box assembly is a device used by aquarists for, as the name indicates, skimming water from the surface of the body of water in an aquarium without the need for drilling holes in the walls or bottom of the aquarium. The basic structure of a skimmer box assembly includes an inlet tank, a siphon tube and an outlet tank, normally with the inlet tank attached to the outlet tank with some means. The skimmer box assembly is mounted on the frame of the aquarium with the inlet tank partly immersed in the aquarium water.

The inlet and outlet tanks are filled with water and the siphon tube is "started" by evacuating air from the siphon tube so that it fills with water. One simple starting technique is to insert one end of a small tube into the outlet end of the siphon to a point near the highest point of the siphon and to then apply suction to the other end of the tube until the air has been evacuated. After the siphon has been started, water will flow through the siphon tube as long as the water level in the inlet tank is higher than the water level in the outlet tank. As long as the siphon tube remains filled with water, the siphon tube provides the fluid connection between the aquarium and the outlet tank.

In operation, water is pumped into the aquarium from a filtration system located below or behind the aquarium. The water level in the aquarium rises and water from the aquarium flows into the inlet tank. The water level in the inlet tank rises, creating a differential pressure between the inlet tank and outlet tank and forcing water through the siphon tube into the outlet tank on the outside of the aquarium. The outlet tank typically has some means of maintaining a selected water level combined with a means for draining water out of the outlet tank into the filtration system.

Figure 1:
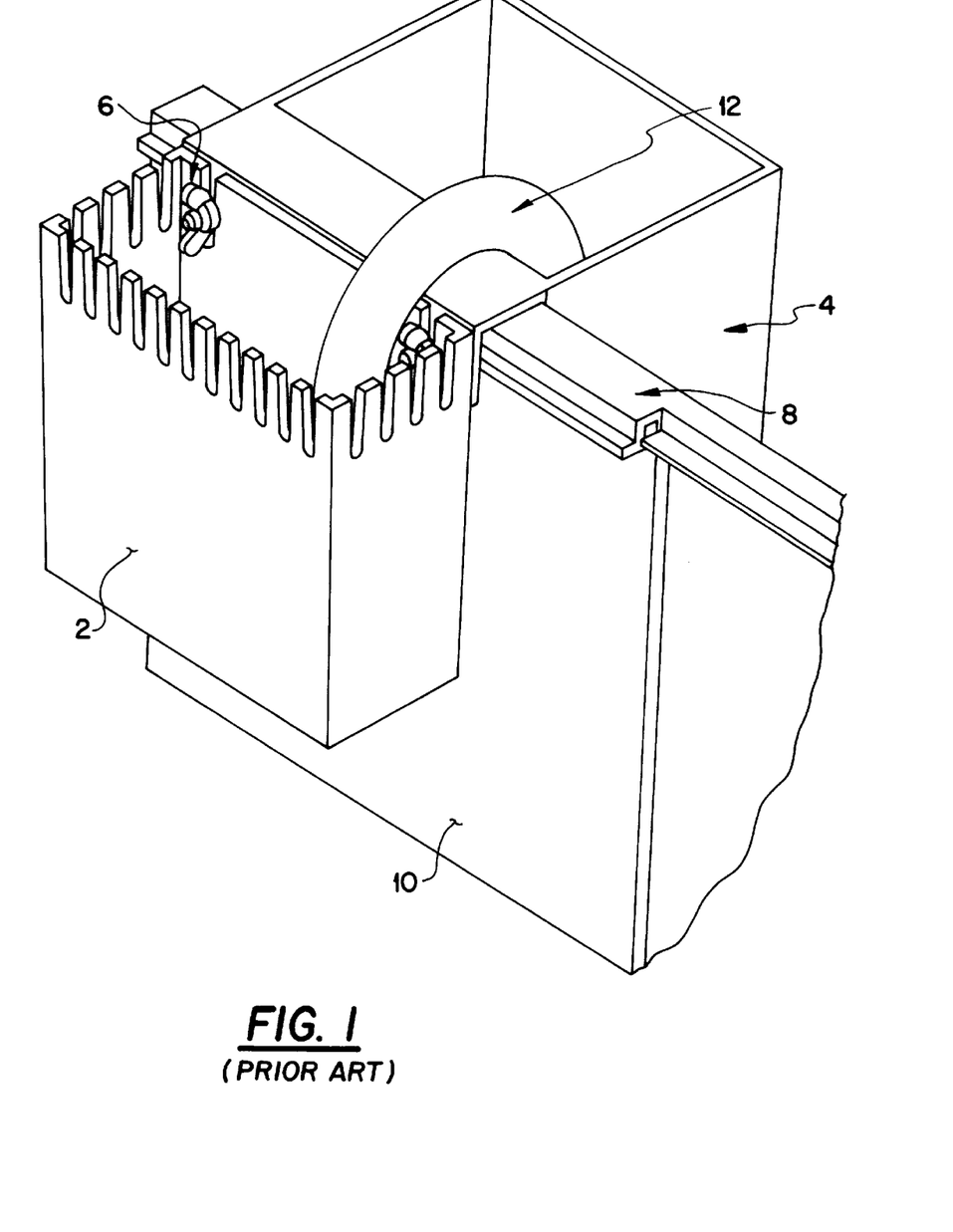
FIGS. 1 and 2 are perspective views of a prior art skimmer box assembly, which has been described above.
Figure 2:
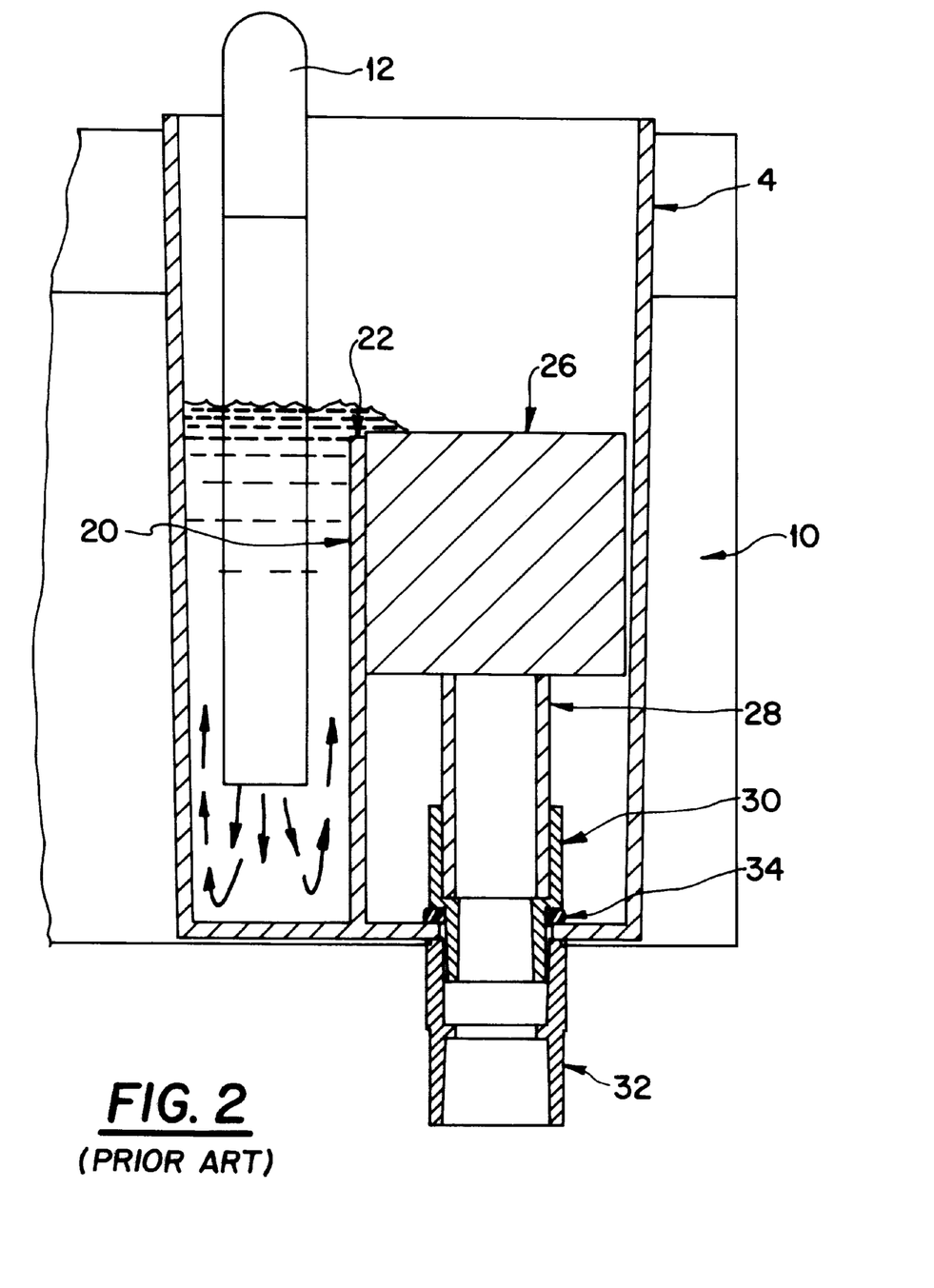

A conventional skimmer box assembly is illustrated in FIGS. 1 and 2. This assembly includes an inlet tank 2 attached to an outlet tank 4 by conventional attachment means 6 which in the illustrated assembly are composed of horizontally extending screws secured to outlet tank 4 and wing nuts which clamp inlet tank 2 to outlet tank 4. The assembly is placed on a frame 8 at the upper edge of an aquarium tank 10 with inlet tank 2 inside tank 10 and partly immersed in the aquarium water (not shown) and outlet tank outside tank 10. The upper edge of inlet tank 2 has an array of slots to allow aquarium water to flow into tank 2. A siphon tube 12 extends between tanks 2 and 4 and passes over frame 8.

As shown in FIG. 2, outlet tank 4 has a weir 20 which extends across the entire width of tank 4, perpendicular to the aquarium tank wall which separates tank 2 from tank 4. Weir 20 has an upper edge 22 located below the top of tank 4 and generally in a region midway between the top and bottom of tank 4. Weir 20 divides the lower portion of tank 4 into a siphon chamber and an outlet chamber. The siphon chamber receives the outlet end of siphon tube 12.

The outlet chamber contains a filter pad 26, a flow tube 28 and a flow tube fitting 30 in which flow tube 28 is retained. Typically, filter pad 26, located on top of flow tube 28, is made of a reticulated polyester foam. Fitting 30 extends through an opening in the bottom of tank 4 and is attached, beneath tank 4, to a further fitting 32 which is provided for connection of a hose or tube that will extend, in a known manner, to an aquarium water sump. An O-ring 34 may be provided between fitting 30 and the bottom of tank 4 to seal the opening in the bottom of tank 4.

The skimmer box assembly is installed by placing tank 4 on frame 8 and placing tank 2 in the aquarium and attaching it to tank 4 by attachment means 6. The aquarium is filled to a level above the bottom of the slots on inlet tank 2, so that tank 2 becomes filled with water. The user fills outlet tank 4 with water to the level of top 22 of weir 20. Then, siphon tube 12 is placed between the inlet tank and the siphon chamber of outlet tank 4 and the air in siphon tube 12 is evacuated, in the manner described earlier herein, filling siphon tube 12 with water. This removal of air starts siphon tube 12, initiating a flow of water through tube 12. If water is not being pumped into aquarium tank 10, water will flow into inlet tank 2 until the water level in aquarium tank 10 descends to the level of the bottoms of the slots in inlet tank 2. Flow through tube 12 will continue until the same water level is established in inlet tank 2 and outlet tank 4, which level corresponds to the level of top 22 of weir 20, with the excess water flowing over top 22, into the outlet chamber and then out of tank 4 via tube 28. Water exiting tank 4 will normally flow to a filtration system located below the aquarium (not shown).

When the pump in the filtration system is started, water flows into aquarium tank 10, causing the water level in tank 10 to rise. Water flows into inlet tank 2, raising the water level therein and causing water to flow through siphon tube 12 and into outlet tank 4. The water level in the siphon compartment of the outlet tank rises, overflowing top 22 of weir 20. Water passes through filter pad 26, raising the water level in the outlet chamber. When the water level in the outlet chamber rises above the top of flow tube 28, water drains out of outlet tank 4, through fittings 30 and 32 and a hose connected to fitting 32, to the filtration system located below the aquarium.

Filter pad 26 filters debris as well as partially muffling the noise from the water and air mixture exiting outlet tank 4. The noise occurs when a vortex (whirlpool) in the water above flow tube 28 comes into communication with air in tube 28, thus allowing audible noise to "escape" from tube 28. Typically, for a flow tube with a one inch inside diameter, continuous noise begins to occur at flows above, for example, 300 gallons per hour. This noise can be very loud and is quite distracting if the aquarium is located in a quiet room.

BRIEF SUMMARY OF THE INVENTION

It is the primary object of the present invention to alleviate the abovementioned drawbacks.

A more specific object of the invention is to improve the performance of a system for withdrawing water from a container to which water is being continuously or periodically supplied.

A further specific object of the invention is to prevent noise from being produced in such a system during its operation.

Another object of the invention is to control the level of water in the container independently of the existing flow rate of water into and out of the container.

Another object of the invention is to provide a flow rate indication that facilitates water level control.

Yet another object of the invention is to facilitate inspection and replacement of a filter pad in an aquarium skimmer box assembly.

Still another object of the invention is to provide overflow protection in such a container if the system for withdrawing water from the container should become clogged.

The above and other objects are achieved, according to the present invention, by a system for controlling a flow of water out of a container, the container being a component of apparatus for maintaining water at a desired level in an enclosure, said system comprising:

an outflow conduit defining an outlet flow path via which water flows downwardly out of the container, the conduit having an upper end located within the container and having an inlet opening;

a cap overlying said inlet opening and defining with said conduit upper end an annular flow path via which water flows to said inlet opening; and a vent tube extending vertically downwardly through said cap and into said conduit to establish an air-flow path between a region above water in the container and a region within said conduit.

Objects according to the invention are further achieved, in a skimmer box assembly for maintaining water at a desired level in an enclosure, which assembly includes an inlet tank positionable in the enclosure, an outlet tank positionable outside the enclosure, a siphon tube extending between the tanks and having an inlet end in the inlet tank and an outlet end in the outlet tank, and a filter, by installing the filter n the inlet tank so that water must pass through the filter before reaching the siphon tube inlet end.

DETAILED DESCRIPTION OF THE INVENTION

Figure 3:
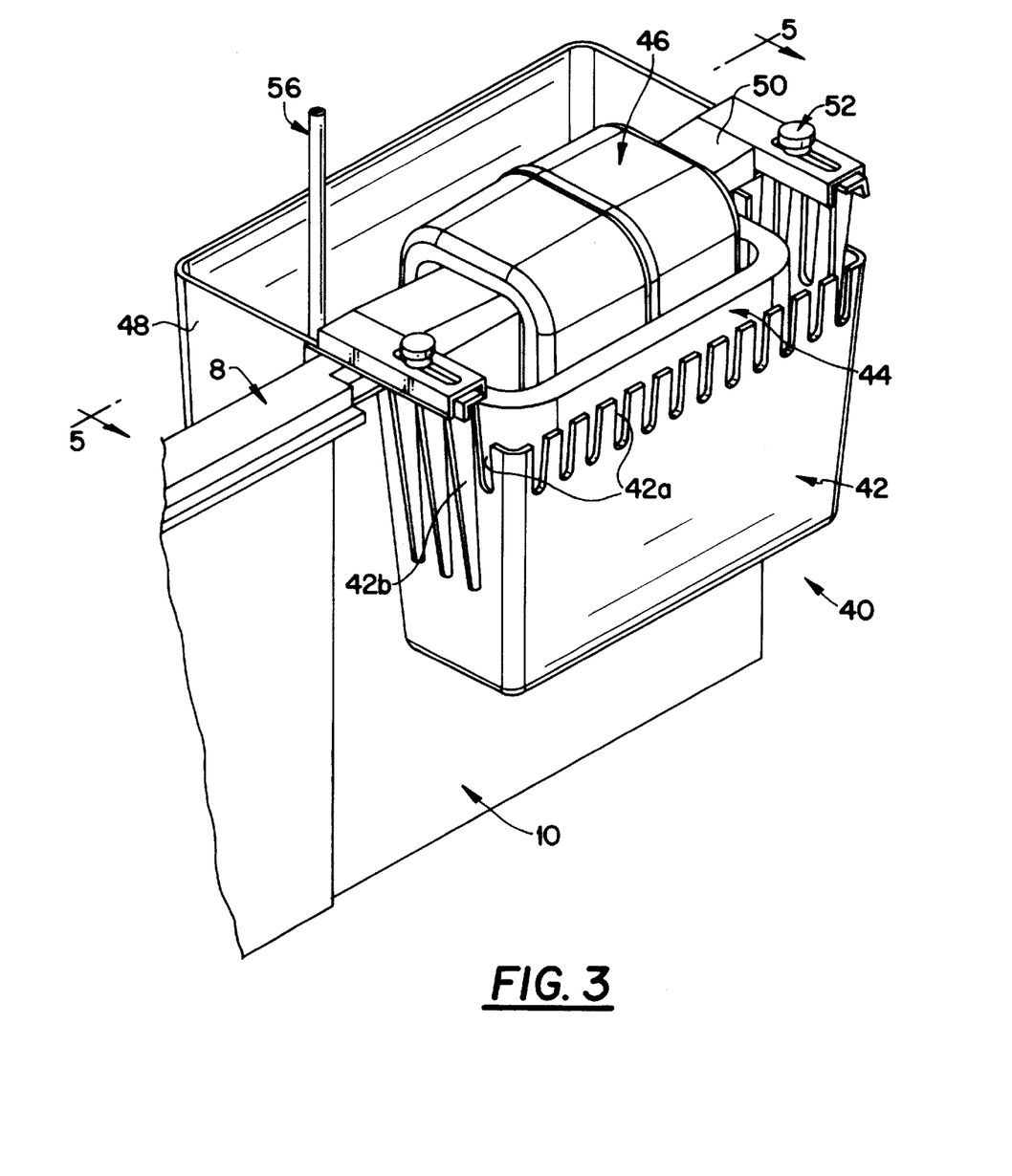
FIGS. 3 and 4 are perspective views of a preferred embodiment of a skimmer box assembly constructed according to the present invention.
Figure 4:
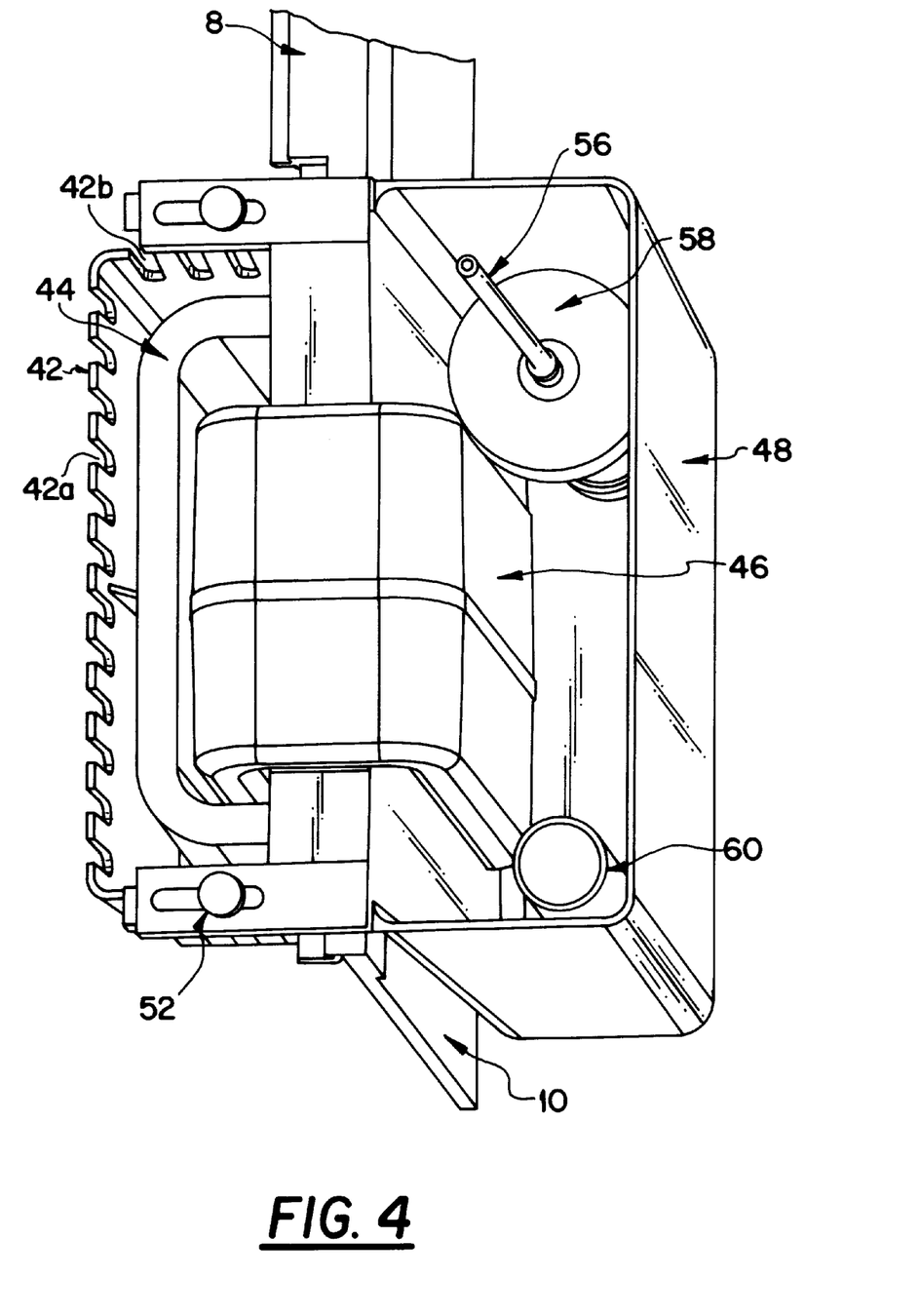

FIGS. 3 and 4 show the basic components of a preferred embodiment of a skimmer box assembly 40 according to the invention for removing water from an aquarium and surface skimming the water in the aquarium at the same time. Surface skimming removes debris that would normally gather on the surface of the aquarium water. Assembly 40 includes an inlet tank 42 located within aquarium tank 10. Water within aquarium tank 10 flows into tank 42 through slots 42a along the upper edges of tank 42. The side walls of tank 42 are provided with reinforcing ribs 42b.

A filter pad 44 is housed in inlet tank 42. Filter pad 44 surrounds the inlet portion of a siphon tube 46 and extends fully across the flow path of water to the entrance end of siphon tube 46. Filter pad 44, which is formed to have a U-shape, provides coarse straining of debris (e.g. leaves, flake fish food, etc.). Filter pad 44 may be made of any material capable of performing a suitable filtering operation in an aquarium system.

Skimmer assembly 40 further includes an outlet tank 48 mounted to the outside of aquarium tank 10 and typically located at the back of aquarium tank 10, outlet tank 48 is in fluid flow communication with inlet tank 42 via siphon tube 46. In the disclosed embodiment, outlet tank 48 carries an attachment member 50 which rests on frame 8 and is provided with slots receiving attachment screws 52 that secure inlet tank 42 to attachment member 50. The upper side edges of inlet tank 42 have rails provided with threaded openings in which attachment screws 52 threadedly engage. Ribs 42b serve to reinforce the connection between the rails and the body of inlet tank 42.

Figure 6:
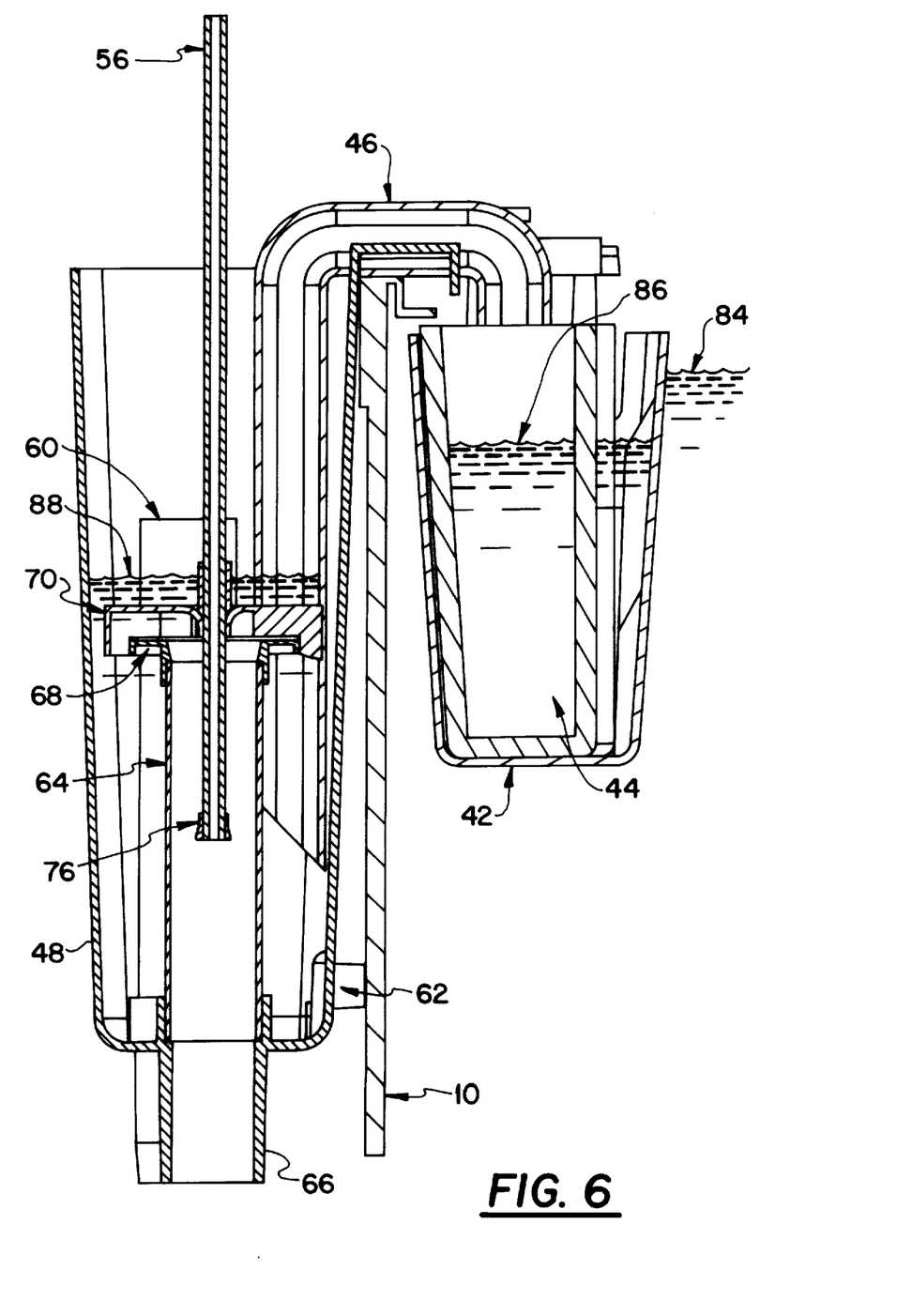
FIG. 6 is a cross-sectional view taken along the line 6—6 of FIG. 5.

Siphon tube 46 provides fluid communication between inlet tank 42 and outlet tank 48 and is formed to provide a relatively wide flow path which supports relatively high flow rates. To operate properly, both ends of siphon tube 46 must be under water and siphon tube 46 must be filled with water, i.e., substantially free of air. The inlet end of siphon tube 46, surrounded by filter pad 44, is located above the bottom of inlet tank 42 to permit water to flow freely into siphon tube 46. The outlet end of siphon tube 46, disposed in outlet tank 48, is similarly located above the bottom of inlet tank 48 to permit water to flow freely out of siphon tube 46. In addition, in the illustrated embodiment, the outlet end of siphon tube 46 is chamfered, as shown in FIG. 6, to facilitate insertion of a suction tube used to withdraw air from the interior of siphon tube 46. Flow between inlet tank 42 and outlet tank 48 occurs via siphon tube 46 when the water level 88 in outlet tank 48 is lower than the water level 86 in inlet tank 42.

FIGS. 3 and 4 also show a vent tube 56 and FIG. 4 shows a flow tube cap 58 and an overflow tube 60, the functions of which will be described below.

Figure 5:
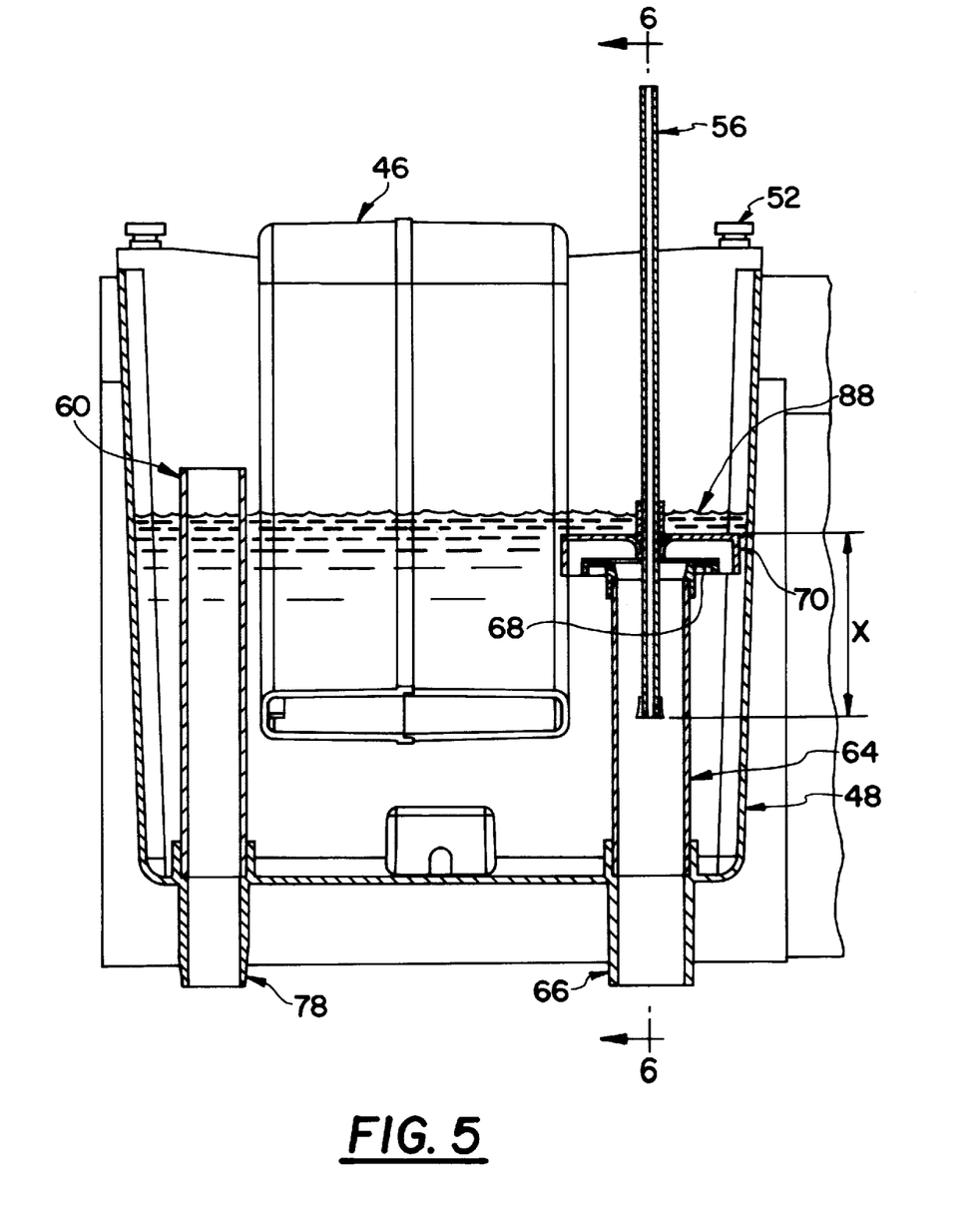
FIG. 5 is a cross-sectional view taken along the line 5—5 of FIG. 3
Figure 7:
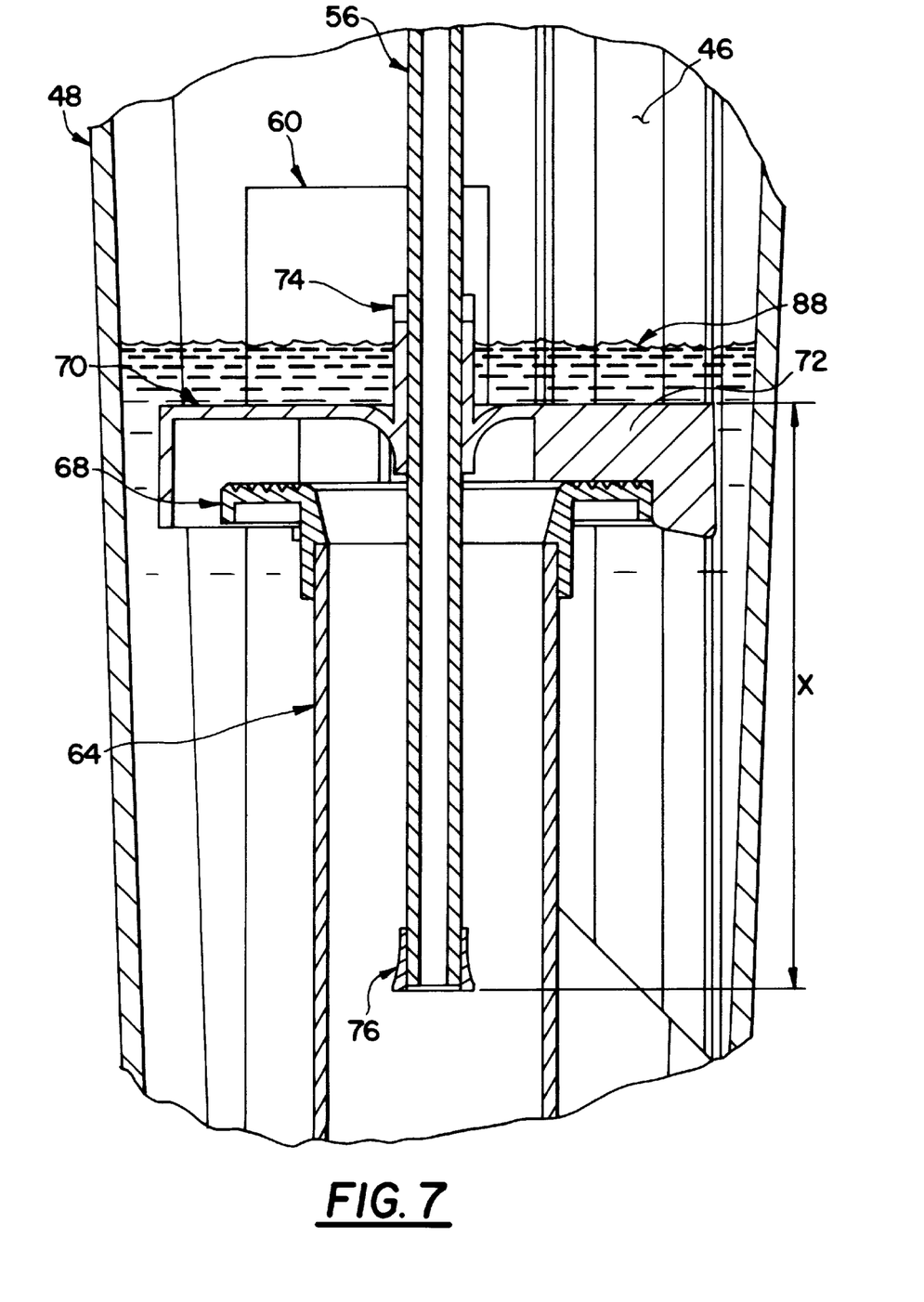
FIG. 7 is a cross-sectional detail view in the same plane as FIG. 6.

Referring now to FIGS. 5, 6 and 7, outlet tank 48 may be provided with a leveling foot 62, shown in FIG. 6, which maintains proper orientation of tank 48. In addition, outlet tank 48 contains a flow, or outlet, tube 64 forming part of a conduit that provides the normal flow path of the water from tank 48 to an aquarium filter system (not shown). Flow tube 64 has an upper end which is open to provide an inlet for water flow into flow tube 64. The lower end of flow tube 64 is press fit or otherwise assembled into a cylindrical receptacle forming part of a coupling 66 in the bottom of the outlet tank 48. The lower end of the cylindrical receptacle has an inwardly extending shoulder forming an abutment for the lower end of flow tube 64. Coupling 66 may be an integral part of tank 48 or may be a separately fabricated part secured in a sealed manner in an opening formed in the bottom of tank 48. Coupling 66 provides a flow path through the bottom of tank 48 and forms a second part of the above-mentioned conduit.

On the exterior of the outlet tank 48, in line with flow tube 64, coupling 66 is provided with a cylindrical connecting element to which a hose (not shown) is attached to direct water to the aquarium filtration system. In the illustrated embodiment, the cylindrical connecting element is a male element that will be force fit into the hose and the characteristics of the hose will be such that it will be connected to the cylindrical connecting element in a sealed manner.

Figure 8:
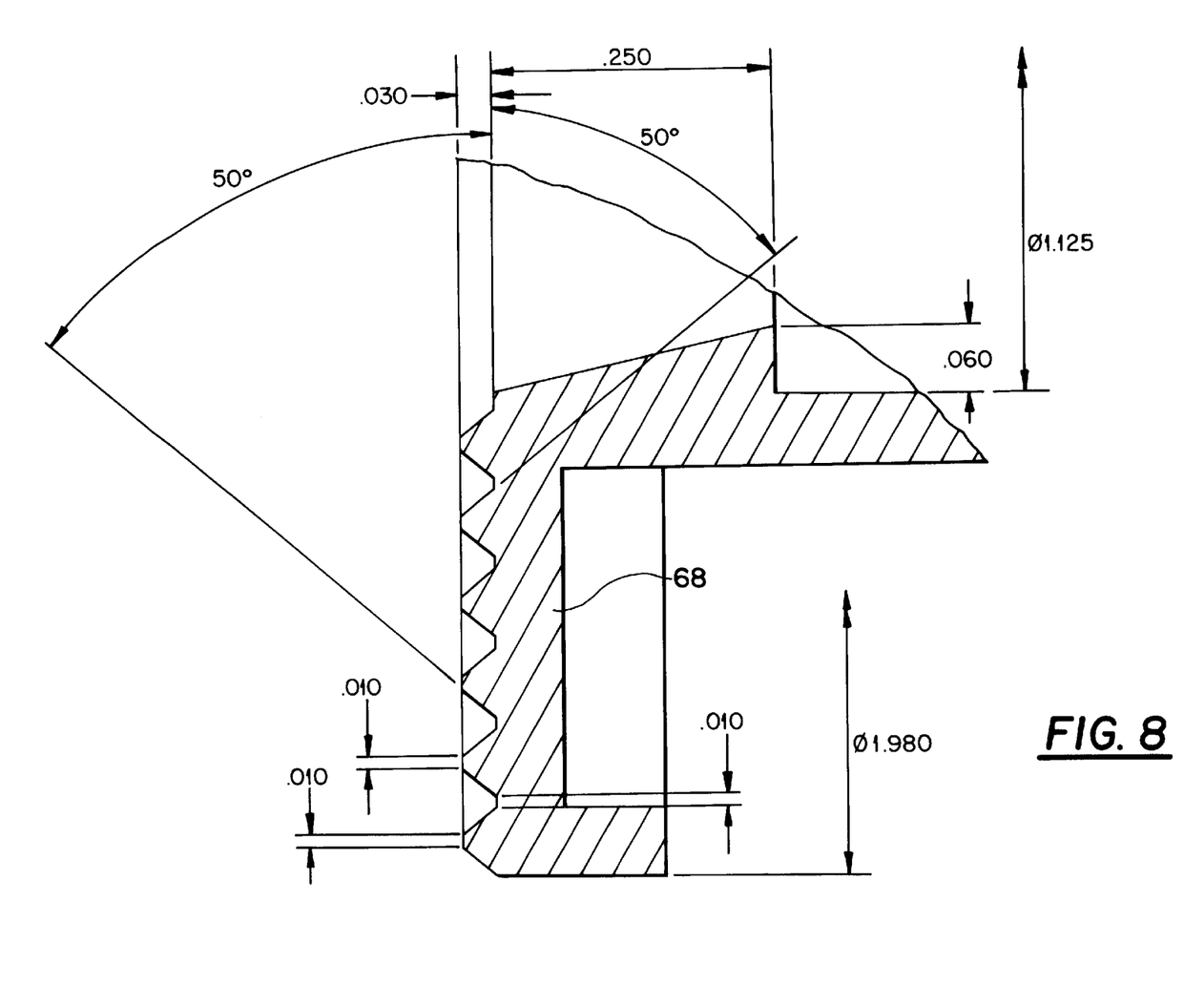
FIG. 8, which is a detail view of a circled portion of FIG. 7.

A flow tube flange 68 is press fit or otherwise attached to the top of flow tube 64. Flow tube flange 68 extends radially outwardly from the top of flow tube 64 and has an upper horizontal surface which serves as the bottom surface of an annular, radial water flow path leading into flow tube 64. The upper horizontal surface of flange 68 over which the water flows has a serrated, or corrugated, form. The resulting cyclic surface height variations cause drag and eddy currents and generally create turbulent flow above the flow tube flange. As a result, the flow resistance of the annular flow path is increased compared to a flow path bounded by a smooth lower surface. The serrated form of the upper surface of flange 68 is created by forming a series of annular grooves in that surface, which grooves are preferably circular and concentric with the longitudinal axis of flow tube 64. Based on investigations carried out thus far, it appears that a suitable degree of turbulence can be achieved with various numbers of grooves having various dimensions. Exemplary dimensions, expressed in inches, of one practical embodiment of the invention are shown in FIG. 8, which is a detail view of a circled portion of FIG. 7.

Flange 68 supports a flow tube cap 70 which overlies flange 68 and the upper, or inlet, end of flow tube 64. Cap 70 fits loosely on top of the flow tube flange 68 and has, at its periphery, a vertical, downwardly extending skirt. Cap 70 is positioned on flange 68 by a plurality of ribs 72 preferably forming an integral part of cap 70. The downwardly facing horizontal face of cap 70 and the upwardly facing horizontal face of flange 68 delimit a horizontal, annular water flow path ahead of the inlet end of flow tube 64 and the vertical dimension of the space between the surfaces of flow tube flange 68 and flow tube cap 70 is determined by the height of ribs 72. The magnitude of this vertical dimension is selected in dependence on the diameter of the flow path through flow tube 64. Investigations carried out to date indicate that good flow control can be achieved according to the invention if this vertical dimension is at least approximately equal to one-fourth of the internal diameter of flow tube 64. This dimension will make the area of the annular flow path just ahead of the inlet end of flow tube 64 substantially equal to the cross-sectional area of the flow path through flow tube 64. For this relationship, the cross-sectional area of vent tube 56 can be ignored because it is substantially smaller than the cross-sectional area of the flow path through flow tube 64.

At the periphery of cap 70, ribs 72 project downwardly to contact a vertical, downwardly extending skirt at the periphery of flange 68. Thus, ribs 72 act to center cap 70 relative to the longitudinal axis of flow tube 64. In the illustrated embodiment, there are three ribs 72. According to preferred embodiments of the invention, cap 70 is dimensioned so that, when cap 70 assembled to flange 68 the lower edge of the skirt at the periphery of cap 70 is at the same level as, or slightly lower than, the lower edge of the skirt at the periphery of flange 68. This creates a short, annular upward flow path ahead of the above mentioned horizontal, annular water flow path, the upward flow path being an entrance flow path to the horizontal, annular water flow path.

Cap 70 has at its center a tubular member which provides an open, vertically extending passage of circular cross section and receives vent tube 56. The passage is dimensioned to allow vent tube 56 to slide easily therein in the vertical direction while maintaining at least an approximately coaxial arrangement between the longitudinal axes of tubes 56 and 64. Vent tube 56 is held in a selected vertical position relative to cap 70 by a tension ring 74. Tension ring 74 may be an elastomeric element which is dimensioned to allow a user to slide ring 74 along the length of vent tube 56 but which remains in a fixed position on vent tube 56 when not subject to an external displacement force. Thus, ring 74 acts to maintain tube 56 in a selected vertical position relative to cap 70, and flow tube 64, when the skimmer box assembly is in operation. As a result, the lower end of vent tube 56 is held at a desired vertical distance from the upper end of flow tube 64. The effect of the vertical position of vent tube 56 on the rate of flow of water out of tank 48 will be described below.

Vent tube 56 is open at both ends to provide an air flow path. The lower end of vent tube 56 is located in flow tube 64 at a selected distance below the upper end of flow tube 64. The length of vent tube 56 is selected so that when the lower end of vent tube 56 is at the greatest desired distance below the upper end of flow tube 64, the upper end of vent tube 56 will be above the highest desired water level in tank 48. However, it would be advantageous to make vent tube 56 somewhat longer to allow a user to grasp vent tube 56 more easily when a height adjustment is to be made.

The lower end of vent tube 56 carries, on its outer peripheral surface, a vent tube flare 76 that protrudes radially outwardly within flow tube 64. In the region below the lower end of vent tube 56, vent tube flare 76 separates the water flowing through flow tube into a mixed phase composed primarily of water in the outer portion of the flow path, i.e., adjacent the inner surface of flow tube 64, and air in the center portion of the flow path. Vent tube flare 76 provides resistance to water flow through flow tube 64 and is an important feature for controlling water level in the outlet tank 48, as will also be described below.

Figure 9:
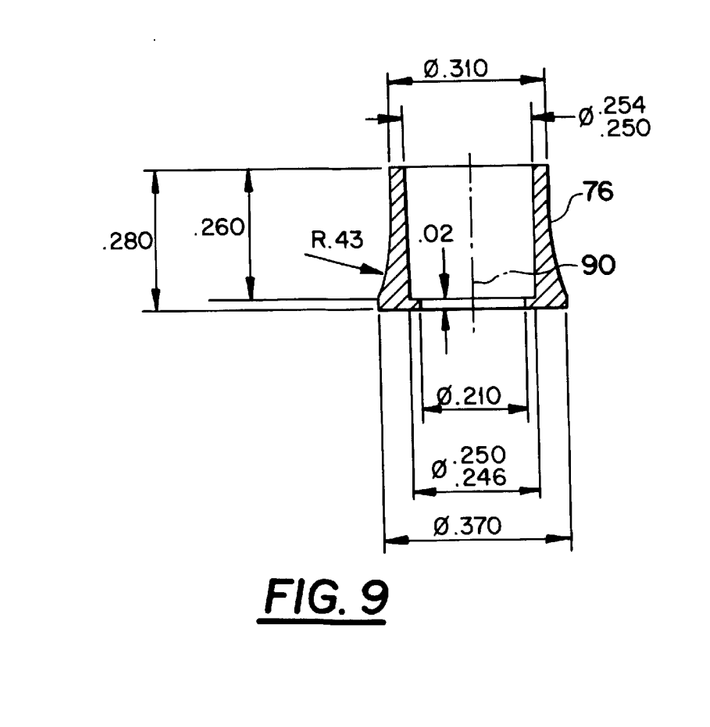
FIG. 9 is a cross-sectional view of one component of the skimmer box assembly shown in FIGS. 3–7.

The shape and dimensions of one suitable embodiment of vent tube flare 76 are illustrated in FIG. 9, where all dimensions are expressed in inches. The illustrated vent tube flare 76 is axially symmetrical throughout its length, i.e., flare 76 has a circular outline in every plane perpendicular to its longitudinal axis 90. A flare 76 having the illustrated dimensions would be suitable for use with a vent tube 72 having an outer diameter of 0.25 inch and an outlet tube 64 having an internal diameter of 1 inch.

Overflow tube 60 is press fit or otherwise assembled into a cylindrical receptacle forming part of a coupling 78 which is essentially identical to coupling 66, described earlier herein. Thus, as shown, the lower end of the cylindrical receptacle has an inwardly extending shoulder forming an abutment for the lower end of overflow tube 60 and a cylindrical connecting element to which a hose (not shown) is attached to direct overflow water to the aquarium filtration system.

The upper, or inlet, end of overflow tube 60 is at a higher level than flow tube cap 70 and is above the maximum height of water level 88 in tank 48 under normal operating conditions. Therefore, during normal operation, water in tank 48 will not rise to the level of the inlet end of overflow tube 60. However, if the path through which water normally flows should become clogged with debris, the water level in the outlet tank 48 will rise to the level of the inlet end of overflow tube 60 and water will therefore be removed form tank 48 via overflow tube 60. This will prevent unacceptably high aquarium water levels that may cause the aquarium to overflow or may empty the filter system sump, causing pump cavitation.

The skimmer box assembly described above is mounted on aquarium tank 10 by first loosely attaching inlet tank 42 to outlet tank 48 with the two attachment screws 52 and then placing this assembly over top frame 8 of aquarium tank 10, normally at the back of aquarium tank 10, with inlet tank 42 inside aquarium task 10. Inlet tank 42 is positioned as close as possible to the back wall of aquarium tank 10 and then attachment screws 52 are tightened. Siphon tube 46 is installed between inlet and outlet tanks 42, 48 with the longer end of siphon tube 46 in outlet tank 48. Filter pad 44 is installed between siphon tube 46 and the front and side walls of inlet tank 42; the vertical edges of filter pad 44 are held in contact with the rear wall of tank 42 and the horizontal bottom edge of filter pad 44 is held in contact with the bottom wall of inlet tank 42, as can be seen in FIGS. 4 and 6, so that water must pass through filter pad 44 before entering siphon tube 46. Appropriate projections may be provided on the inner surfaces of the front and/or side walls of inlet tank 42 to hold filter pad 44 in the desired position and configuration.

If not previously installed, overflow tube 60 and the flow tube assembly consisting of flow tube 64 and the flow tube flange 68, are pressed or otherwise assembled into the appropriate cylindrical receptacles. The flow cap assembly, consisting of flow tube cap 70 and a subassembly composed of vent tube 56, vent tube flare 76 and tension ring 74, is placed on flow tube flange 68 with vent tube 56 protruding downwardly into flow tube 64. Hose connections are then made between couplings 66 and 78 and the filtration system (not shown).

Water is added to aquarium tank 10 until the water level 84 in tank 10 is just above the bottom of the slots in the vertical surfaces of the inlet tank 42. At this time the water level 86 in inlet tank 42 will be even with water level 84. Water is added separately to outlet tank 48 to a point at which water just begins to flow out of flow tube 64. Water is added to the filtration system sump (not shown) to a "start" level determined by the manufacturer of the filtration system. Siphon tube 46 is filled in place with water by evacuating the air within siphon tube 46. The evacuation of air from siphon tube 46 will cause water to be drawn into siphon tube 46 from both inlet tank 42 and outlet tank 48. When siphon tube 46 is filled with water, and further water is not yet being added to aquarium tank 10, the water levels in inlet tank 42 and outlet tank 48 will equalize at the level of overflow into the flow tube 64. The water level in aquarium tank 10 will drop to the bottom of the slots in the inlet tank, with any excess water flowing out of outlet tank 48 to the filtration system located below aquarium tank 10.

A pump that is part of the filtration system is started and water is pumped into aquarium tank 10. The water level in aquarium tank 10 rises, causing water to flow into inlet tank 42, through filter pad 44 and siphon tube 46 and into outlet tank 48. The flow rate of water through siphon tube 46 is a direct function of the difference in height between water level 86 in inlet tank 42 and the water level 88 in outlet tank 48. Therefore, as water level 88 rises in outlet tank 48, the water in inlet tank 42 also rises until the difference in water level height between tanks 42 and 48 is sufficient to cause the flow rate of water through siphon tube 46 to be equal to the flow rate of water from the pump into aquarium tank 10. This is the condition of flow equilibrium.

According to one significant advantage of the present invention, the components 56, 64, 68 and 70 control the flow of water out of outlet tank 48 in a manner which eliminates virtually all noise caused by water exiting the outlet tank 48. Noise prevention is accomplished by preventing a vortex from occurring in the water entering flow tube 64 and yet providing an open air passage, through vent tube 56, to the water stream in flow tube 64 at all times. The combination of flow tube flange 68, flow tube cap 70 and vent tube 56 produce this result.

One advantageous feature of preferred embodiments of the invention is that when cap 70 is assembled to flange 68, the lower edge of the skirt at the periphery of cap 70 is at the same level as, or slightly lower than, the lower edge of the skirt at the periphery of flange 68. This creates a water flow path that contributes significantly to the prevention of vortexes at relatively high flow rates (e.g. 500 gph and higher).

Another important feature of the invention resides in the vertical, annular cross-sectional area of the horizontal flow path formed between the horizontal surfaces of flange 68 and cap 70 at a point just before the water turns into the inlet end of flow tube 64. This annular cross-sectional area is preferably approximately equal to the cross-sectional area enclosed by the inside diameter of flow tube 64.

A further important feature of the invention resides in the serrations on the surface of flange 68. These serrations create resistance and turbulence at the surface of flange 68. This resistance, especially at low flow rates, requires a higher water level in the outlet tank 48 to produce a certain water flow rate through the horizontal flow path, thus assuring that water level 88 will remain above the top surface of cap 70. As a result, vortexing and, therefore, noise are prevented over a wide range of flow rates and even at relatively low flow rates as low as 300 gph.

An additional important feature of the invention resides in the structure of the vent tube assembly. Vent tube flare 76 creates resistance to water flow and diverts flowing water away from the end of vent tube 56 to create an air path into the water stream. Since this air path will be continuously open during normal operation, there is no surging, gurgling or hissing of water in flow tube 64.

At high flow rates (e.g. >500 gph), it is important to maintain the water level in the outlet tank at approximately ¼" to ⅜" above the top of the cap 70 to avoid unacceptably high water levels in the aquarium. Since the water flow rate through siphon tube 46 is determined by the difference between the water levels in inlet tank 42 and outlet tank 48, higher flow rates will require greater water level differentials. If water level 88 in outlet tank 48 is high, water level 86 in inlet tank 42 will be correspondingly higher. If water level 88 in outlet tank 48 is at such a height that the water level required in inlet tank 42 to maintain flow equilibrium is higher than the desired aquarium tank water level 84, the flow rate through the siphon tube 46 will be too low to achieve equilibrium with the pump. In this condition, the aquarium water level 84 will eventually rise to a height necessary to provide the differential pressure needed to cause equilibrium between the pumping rate and the outlet flow rate from outlet tank 48 and this may result in an undesirably high water level 84. In addition, if outlet tank water level 88 becomes very high, one of two undesirable situations may occur: (a) the aquarium tank water level 84 may rise to the point where water overflows tank 10, or (b) the filter system pump may empty the filter system sump, causing air to vortex into the filter system pump.

According to a significant feature of the present invention, water level 88 in outlet tank 48 can be adjusted to a desired height for any existing flow rate by suitably positioning the lower end of vent tube 56 relative to the top of flow tube cap 70, or other fixed reference point in tank 48, to achieve a particular value for the vertical distance X between the lower end of vent tube flare 76 and the fixed reference point in tank 48. Specifically, the value of X needed to maintain a given water level in tank 48 varies directly with flow rate; X will be smaller for a low flow rate than for a high flow rate. The same relation will obtain if X is assumed to be the vertical distance between the lower end of vent tube 56 and water level 88 in tank 48.

The operating mechanism which enables the positioning of vent tube 56 to effect regulation of the water level in outlet tank 48 is as follows: In a free flowing, open system, the water pressure at the end of vent tube flare 76 is proportional to the height of water level 88 above flare 76. Assuming a constant discharge coefficient for the system consisting of vent tube 56, vent tube flare 76 and outlet tube 64, the height of water level 88 in outlet tank 48 will be roughly proportional to the square of the water velocity at the flare 76. Hence, to maintain level 88 at a desired height, the distance X will be significantly greater, at least 2.8 times, for a flow rate of 600 gph than for a flow rate of 360 gph.

Thus, the present invention allows for variations in distance X vs. flow rate in order to maintain a desired height for water level 88 in outlet tank 48. The vent tube assembly structure permits the vertical position of vent tube 56 to be adjusted relative to flow tube 64. The fit of vent tube 56 in flow tube cap 70 is loose, allowing vent tube 56 to slide up and down. On the other hand, tension ring 74 fits somewhat tightly onto the outside surface of vent tube 56. However, tension ring 74, because it is a spring-like structure, can be easily slipped up and down along vent tube 56 to set the distance X of the lower end of vent tube 56 relative to the top of flow tube 64. Rather than allowing water level 88 in outlet box 48 to rise in order to create a needed higher pressure, the vertical distance between the lower end of vent tube 70 and the top of flow tube 64, or cap 70, is increased. The overall effect is the same relative to the end of the vent tube 56, but water level 88 in outlet box 48 will be maintained at a desired height.

If distance X is to be adjusted to maintain water level 88 at a given height, then the vertical distance, h, between the lower end of vent tube flare 76 and water level 88 can be used as the distance which bears a functional relation to flow rate. The relation between the distance h and flow rate, Q, can be derived as follows:

$$Q = k_1 * A * V,$$

where: Q is flow rate in gallons/hour,

A is the annular area between the inner surface of flow tube 64 and the outer surface of the lowermost end of vent tube flare 76, in square inches, V is the water velocity in a horizontal plane passing through the lowermost end of vent tube flare 76, and $k_1$ a units correction factor.

According to a simplified form of Bernoulli's equation, $$h = k_2 * \rho * V^2 / (2g),$$

where: h is as defined above, $\rho$ is the density of water in $lb/in^3$, g is the gravitational constant in $inches/sec^2$, and $k_2$ is a units correction factor.

If the second equation is rearranged as an expression for the value of V, and the resulting expression for V is substitute into the first equation, the result is:

$$Q = k_1 * A * (2 * g * h / (k_2 * \rho))$$

In the last equation, A is constant for all vertical positions of vent tube flare 76 and, all other terms, excpet for Q and h, are constants or units correction factors. Therefore, h is proportional to $Q^2$.

Figure 10:
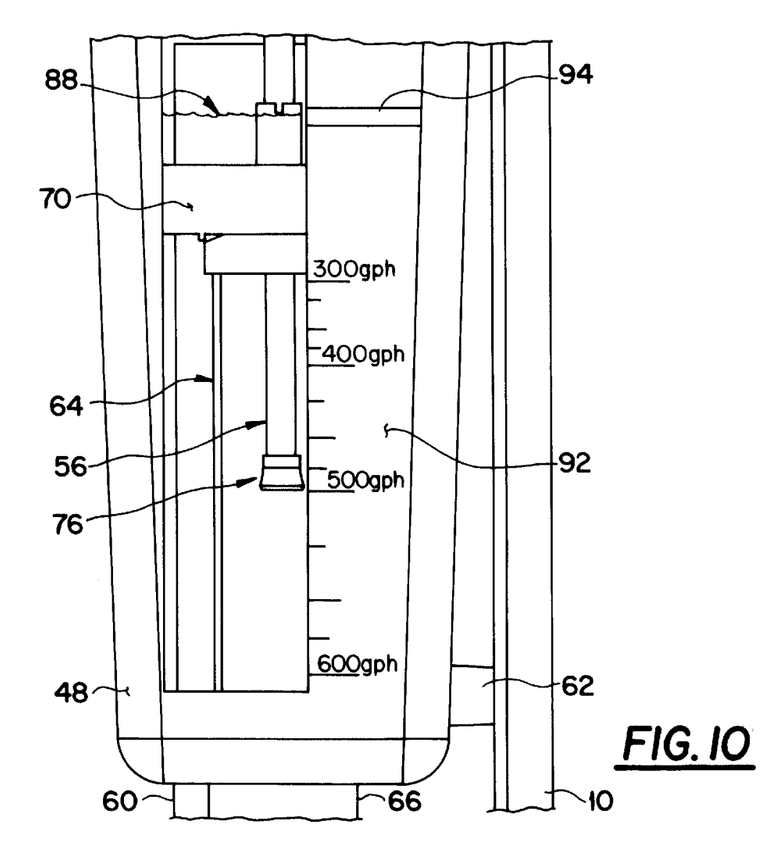
FIG. 10 is a side elevational detail view of a portion of the skimmer box assembly according to the invention.

Since a direct relation does exist between the value of h and the flow rate, outlet tank 48 of a skimmer box assembly according to the invention can be provided with a visible scale to enable the user to establish an initial vertical position for vent tube flare 76 that will cause water level 88 to be at the desired height for a pre-determined flow rate. For this purpose, as shown in FIG. 10, outlet tank 48 and flow tube 64 may be molded components made of a transparent or semi-transparent plastic to thereby enable vent tube flare 76 to be visible through the walls of tank 48 and flow tube 64. On the outer surface of the side wall of tank 48 which adjacent to flow tube 64 is provided with a panel, or label 92, carrying markings indicating the appropriate vertical level of the lower edge of vent tube flare 76 for various water flow rates. Label 92 further carries markings 94 in the form of a horizontal band or two vertically spaced horizontal lines identifying the desired height of water level 88. By way of example, it may be desired to locate the end of the band or the lower line approximately about ¼ inch above the top of flow cap 70 and to give the band, or the distance between the two lines, a width of the order of 3/16 inch.

At the time that a skimmer box assembly, according to the invention, is placed into operation, or at a time when a change is made in the water flow rate, the user will initially place the lower end of flare 76 opposite the appropriate flow rate marking on label 92. After the aquarium system has operated for a period of time at the pre-determined flow rate, the height of water level 88 can be visually compared with mark 94 and if the height of water level 88 is not aligned with that mark, the user can move vent tube 56 up or down by a small amount until the desired water level height adjustment has been completed.

Another significant novel feature of the present invention is that filter pad 44 is located in the inlet tank 42. With filter pad 44 in this position, one can quickly determine if filter pad 44 requires cleaning or changing and can easily remove filter pad 44 for these purposes. In contrast, conventional skimmer boxes contain a filter pad which is out of sight in the outlet tank, given that the outlet tank will normally be located on the rear wall of the aquarium tank, increasing the risk that clogging of the filter pad will go unnoticed while the water level in the outlet tank rises, resulting in higher water levels in the inlet tank and aquarium and thus raising the possibility that the aquarium will overflow and the filter system pump will be caused to cavitate.

According to another novel feature of the invention, safety overflow tube 60 in outlet tank 48 will prevent water level 88 from rising beyond a fixed maximum height. If outlet tube 64 were to become clogged, or if vent tube 56 is not correctly set, overflow tube 60 will prevent unacceptably high water levels in the aquarium.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What we claim is:

1. A system for controlling a flow of water out of a container, the container being a component of apparatus for maintaining water at a desired level in an enclosure, said system comprising:

an outflow conduit defining an outlet flow path via which water flows downwardly out of the container, the conduit having an upper end located within the container and having an inlet opening;

a cap overlying said inlet opening and defining with said conduit upper end an annular flow path via which water flows to said inlet opening; and a vent tube extending vertically downwardly through said cap and into said conduit to establish an air-flow path between a region above water in the container and a region within said conduit.

2. The system of claim 1 wherein said conduit has a flange extending radially outwardly from said inlet opening and forming part of said conduit upper end, said flange having an upper surface forming a lower boundary of the annular flow path.

3. The system of claim 2 wherein said cap has a periphery and includes a downwardly extending skirt which surrounds, and is radially spaced from, said flange to define with said flange an entrance flow path via which water flows upwardly to the annular flow path.

4. The system of claim 3 wherein said flange has a lower extremity, and said skirt of said cap extends downwardly to a level not higher than the lower extremity.

5. The system of claim 2 wherein said upper surface of said flange has surface irregularities which impart an increased flow resistance to the annular flow path.

6. The system of claim 5, wherein said surface irregularities comprise a series of grooves which extend transversely to the direction of flow through the annular flow path.

7. The system of claim 1, wherein said vent tube has a lower end located within said outflow conduit and is vertically movable relative to said cap for varying the distance between the lower end of said vent tube and said upper end of said outflow conduit.

8. The system of claim 7 further comprising diverter means mounted at said lower end of said vent tube for deflecting water which is flowing past said vent tube radially outwardly away from said vent tube.

9. The system of claim 7 further comprising a retaining element mounted on said vent tube and manually movable relative to said vent tube for holding said vent tube in a selected position relative to said cap.

10. A skimmer box assembly for maintaining water at a desired level in an enclosure, said assembly comprising: an inlet tank positionable in the enclosure; a container constituted by an outlet tank positionable outside the enclosure, said outlet tank having a bottom wall provided with a water outlet opening; a siphon tube extending between the tanks and having an inlet end in the inlet tank and an outlet end in the outlet tank; and the system according to claim 1 installed in said outlet tank with said outlet flow path in communication with said water outlet opening.

11. The skimmer box assembly of claim 10 further comprising a filter installed in said inlet tank in a position such that water must pass through said filter before reaching said siphon tube inlet end.

12. The skimmer box assembly of claim 10 wherein said outlet tank has a second outlet opening and further comprising an overflow tube installed in said outlet tank, said overflow tube having an outlet end communicating with said second outlet opening and an inlet end located above said cap.

13. An aquarium system comprising: an aquarium tank having a tank wall; and the skimmer box assembly of claim 11 mounted on said aquarium tank wall, with said inlet tank located within said aquarium tank.

14. An aquarium system comprising: an aquarium tank having a tank wall; and the skimmer box assembly of claim 10 mounted on said aquarium tank wall, with said inlet tank located within said aquarium tank.

15. In a skimmer box assembly for maintaining water at a desired level in an enclosure, which assembly includes an inlet tank positionable in the enclosure, an outlet tank positionable outside the enclosure, a siphon tube extending between the tanks and having an inlet end in the inlet tank and an outlet end in the outlet tank, and a filter, the improvement wherein said filter is installed in said inlet tank, is spaced horizontally from said siphon tube inlet end and is oriented so that water passes in a substantially horizontal direction through said filter before reaching said siphon tube inlet end.

16. A container for holding a body of water, said container having a bottom wall provided with a water outlet opening, in combination with: the system according to claim 7 installed in said container with said outlet flow path in communication with said water outlet opening; and a water supply member for supplying water to said container at a flow rate, wherein:

said container has a side wall which is at least partially transparent and said outflow conduit is at least partially transparent to allow said lower end of said vent tube to be viewed through said container side wall and said outflow conduit; and said container further comprises a scale having markings each disposed at a respective distance below said upper end of said outflow conduit at which said lower end of said vent tube is to be located to maintain water in said enclosure at a given height when water is flowing into said enclosure at a respective flow rate.

17. The container of claim 16 wherein said scale further has a water surface level height indicium indicating the given height.

18. The skimmer box assembly of claim 15 wherein said inlet tank has a bottom wall and said filter has a horizontal bottom edge disposed in contact with said bottom wall of said inlet tank.

* * * * *